(12) United States Patent
Hashimoto (10) Patent No.: US 6,708,726 B2
(45) Date of Patent: Mar. 23, 2004

(54) VALVE DRIVING APPARATUS (75) Inventor: Katsuo Hashimoto, Nagano (JP)

(73) Assignee: Kabushiki Kaisha Sanyo Seiki Seisakusho, Nagano (JP)

( * ) Notice: Subject to any disclaimer, the term of this patent is extended or adjusted under 35 U.S.C. 154(b) by 95 days.

(21) Appl. No.: 10/152,622

(22) Filed: May 23, 2002

(65) Prior Publication Data

US 2002/0179164 A1 Dec. 5, 2002

(30) Foreign Application Priority Data

May 23, 2001 (JP) .................................... P2001-153996

(51) Int. Cl.[7] .............................................. F16K 11/14
(52) U.S. Cl. ...................... 137/870; 251/251; 251/263; 251/289
(58) Field of Search ................................ 137/870, 871; 251/251, 263, 289

(56) References Cited

U.S. PATENT DOCUMENTS

| | | | | |
|---|---|---|---|---|
| 4,570,663 A | * | 2/1986 | Gould et al. ........... | 137/119.07 |
| 5,007,446 A | * | 4/1991 | Grove .................... | 137/72 |
| 5,398,725 A | * | 3/1995 | Nakazawa et al. ....... | 137/636.1 |
| 6,053,472 A | * | 4/2000 | DeLand ................. | 251/129.11 |
| 6,405,758 B1 | * | 6/2002 | Hara ..................... | 251/289 |

* cited by examiner

Primary Examiner—John Fox
(74) Attorney, Agent, or Firm—Sughrue Mion, PLLC (57) ABSTRACT A first pipe, a second pipe and a third pipe are airtightly connected with each other. A cam member rotates about a rotation axis for moving a valve body so as to open/close the first pipe and the second pipe so that the third pipe is selectively communicated with the first pipe and the second pipe, the cam member being movable in a direction parallel with the rotation axis. A cam actuator drives the cam member so as to move the cam member in the direction parallel with the rotation axis to open both of the first pipe and the second pipe, when the cam member is rotated at a predetermined angle.

9 Claims, 9 Drawing Sheets

VALVE DRIVING APPARATUS

BACKGROUND OF THE INVENTION

The present invention relates to a refrigerant control of a refrigerator, and more particularly to a driving device for a motor-driven refrigerant three-way valve.

A conventional motor driven refrigerant three-way valve is categorized into a first type of the motor driven refrigerant three-way valve in which a valve is opened/closed by turning a resin disc valve, and a second type of the motor driven refrigerant three-way valve in which a valve is opened/closed by moving a steel ball, and operable in any of four modes; a) opening-closing mode, b) closing-closing mode, c) closing-opening mode, and d) opening-opening mode.

In the resin valve of the first type, the resin disc valve is turned while being in close contact with the valve port. Accordingly, a design of the 4-mode construction is easy. In the resin valve, the rotating face of the resin disc valve is slid in a state that it is strongly pressed for the purpose of leak prevention. Torque loss of the sliding friction is large, and the friction of the rotating face adversely affects the life of the valve. If the interval of the valve ports arranged and the diameter of the valve port are set to be large, a large operating torque is needed. Therefore, limitation is imparted also to the design of the interval of the valve ports and the diameter of the valve port.

In the ball valve of the second type, the valve ports may be arranged in a line. The opening and closing operations of the valve are performed through the rolling of the ball. Accordingly, the torque loss is small, and a high freedom is secured in arranging the valve ports and selecting the hole diameter. Even if the rotor accuracy is lowered, a pressing force may be concentrated onto the ball valve. As a result, the leak is small and the product quality is easily stabilized. To achieve the opening-opening mode in item "d" above of the four modes for the valve ports, which are arranged on both sides of the rotary shaft of the valve operation cam and on a diameter line while being equidistantly spaced from each other, the valve operating cam must cope with both the completely reverse operations, i.e., opening and closing operations, at the same position: both the valves are simultaneously closed at 0° of the rotational angle of the valve operation cam, and simultaneously opened also at 180°. This makes it difficult to construct such a mechanism.

To cope with this, a conventional technique employs an "opening-opening mode" such that a guide for this mode is additionally provided, and rotor contact, which comes into contact with the rotor for controlling the ball valve, is provided on the end face of a guide bent part. It is placed on the guide, and the whole rotor is lifted along the edge of the guide to thereby release the ball valves. To the "opening-opening mode" construction, two ball valves must simultaneously be moved from their positions aligned with the valve ports. Accordingly, two rotor projections acting on the ball valves must be provided.

In the three modes; a) opening-closing mode, b) closing-closing mode, c) closing-opening mode, one of the rotor projections must be located outside the functional range. Accordingly, the mode selection must be performed within an extremely narrow range. In this respect, high precision is required for the shape and dimensions of the rotor. When the requirements for the mechanical position and precision are strict, high precision is required for the stopping position of the corresponding motor. To prevent a shift of the rotational position, in the case of the DC motor, a position sensor is needed since variations of an inertia movement amount, a movement amount at the time of non-constant torque, and the like are present. In the case of the stepping motor drive, a measure must be taken for an operation failure since a recognition difference by the circuit at the mechanical original point, a shift between the magnetizing position and the cam position, and the like are present. When the sliding part formed by the motor and the guide is an additionally part, it receives a crimping force corresponding to an acting pressure. Accordingly, the valve life is adversely affected.

SUMMARY OF THE INVENTION

Accordingly, an object of the present invention is to provide a ball-valve type motor-driven refrigerant three-way valve which is reliably operable, with a simple construction, in any of the four modes, "opening-closing", "closing-closing", "closing-opening",and "opening-opening" modes, and is reliable and durable.

In order to achieve the above object, according to the present invention, there is provided a valve driving apparatus, comprising:
- a first pipe, a second pipe and a third pipe, which are airtightly connected with each other;
- a valve body;
- a cam member, which rotates about a rotation axis for moving the valve body so as to open/close the first pipe and the second pipe so that the third pipe is selectively communicated with the first pipe and the second pipe, the cam member being movable in a direction parallel with the rotation axis; and
- a cam actuator, which drives the cam member so as to move the cam member in the direction parallel with the rotation axis to open both of the first pipe and the second pipe, when the cam member is rotated at a predetermined angle.

According to the present invention, there is also provided a valve driving apparatus, comprising:
- an inflow pipe;
- an outflow pipe;
- a casing body having an airtight chamber formed with openings respectively communicated with the inflow pipe and the outflow pipe;
- a valve body;
- a cam member, which provides an urging force on the valve body in such a direction that the valve body closes at least one of the openings;
- a cam driver, which provides a driving force for rotating the cam member; and
- a cam actuator, which moves the cam member against the urging force such that the openings are simultaneously opened.

The cam actuator includes: a seesaw portion, which performs a seesaw action in which the urging force moves the cam actuator and the seesaw portion moves the cam member against the urging force as a reaction; and an actuating portion, which moves the valve body to simultaneously open the openings when the seesaw action is performed.

For the simplicity, the cam member provides the urging force by utilizing the driving force of the cam driver, and a direction in which the cam member is moved as the reaction of the seesaw action is a direction parallel with a direction in which the urging force acts.

The seesaw portion extends in a direction perpendicular to a rotation axis of the cam member. A first position at which the urging force is applied is situated in a first end portion of the seesaw portion. The first position serves as a fulcrum of the seesaw action. A second position at which be actuating portion is provided is situated in a second end portion of the see saw portion. A slider which moves the cam member is situated at a third position closer to the second position.

The valve driving apparatus further comprises a guide member which restricts a direction in which the seesaw action is performed. The valve body is spherical body which is urged by an urging member so as to close the openings. The guide member restricts a position of the valve body.

The valve driving apparatus further comprises: a rotor, integrated with the cam member, and a stator, provided an outer periphery of the casing body. A motor formed by the rotor and the stator constitutes the cam driver.

Thus, a large mode selection angle is secured by merely adding one member, that is, the cam actuator. Accordingly, the requirements for the part precision and the assembling precision are lessened, in the cam actuator, the second position side of the seesaw portion is made heavy, so that the weight balance by the own weight is usually kept.

Accordingly, the invention succeeds in providing a valve driving apparatus capable of reliably controlling the four modes, "opening-closing", "closing-closing", "closing-opening", and "opening-opening" modes, and is reliable and durable.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

The preferred embodiments of a valve driving apparatus according to the present invention will be described with reference to the accompanying drawings.

Figure 1:
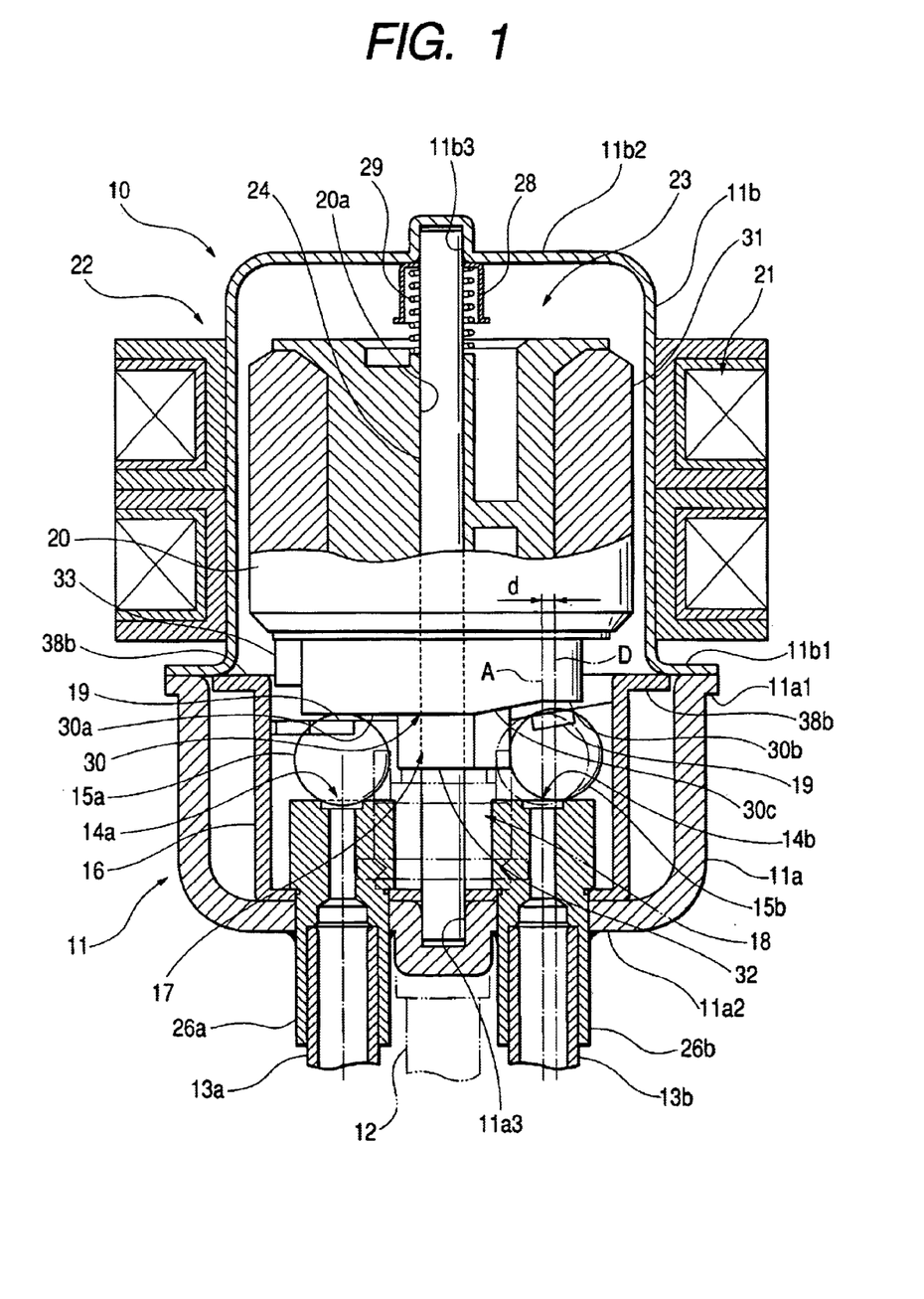
FIG. 1 is a side view, partially broken, schematically showing a valve driving apparatus according to a first embodiment of the invention.

As shown in FIG. 1, a valve driving apparatus according to a first embodiment is designated by reference numeral 10. A pipe 12 through which a refrigerant gas flows in, and pipes 13a and 13b through which the refrigerant gas flows out are airtightly connected to a hermetically sealed body case 11. Those pipes are opened to the inside of the body case 11.

Valve bodies 15a and 15b, a cam member 17, and a cam actuator 18 are disposed within a main case 11 a forming a lower part of the body case 11. The spherical valve body 15a (15b) opens and closes an opening 14a (14b) of an outflow pipe 13a (13b) to switch a flow passage of the refrigerant gas. The cam member 17 acts on the two spherical valve bodies 15a and 15b to thereby open and close the openings 14a and 14b. The cam actuator 18 interlocks with the cam member 17. The two spherical valve bodies 15a and 15b are each associated with a guide member 16 for restrictively controlling a positional shift and an automatic alignment spring 19 as an elastic member. The automatic alignment spring 19 serves to return the spherical valve body 15a (15b) from a biased position D at which the opening 14a (14b) is opened to an alignment position A at which the opening 14a (14b) is closed.

A rotor 20 for turning the cam member 17 is contained within a cover case 11b forming an upper part of the body case 11, and a stator 21 is wound on the outer periphery of the cover case 11b, whereby a motor 22 is formed. The rotor 20 is reciprocatively rotated within an angular range of about 300° through the electromagnetic induction of the stator 21, and is electrically controlled so that it stops at a predetermined rotational angular position.

The body case 11 and the cover case 11b are coupled together to define a cylindrical gas chamber 23 in a manner that the faces of flanges 11a1 and 11b1 extended from the outer periphery of those cases are abutted to each other. Shaft supporting parts 11b3 and 11a3 are recessed at the central pats of a top plate 11b2 of the cover case 11b and a bottom plate 11a2 of the main case 11a, and coaxially aligned with each other. In this state, a main shaft 24 is fixed therein. The main shaft 24 is inserted through a center hole 20a of the rotor 20, and rotatably and slidably supports the rotor 20.

The inflow pipe 12 and the two outflow pipes 13a and 13b are airtightly connected to the bottom plate 11a2 of the main case 11a. The opening 14a (14b) of the outflow pipe 13a (13b) is an opening end within the body case 11 of a valve joint 26a (26b), which is positioned by a through hole 16a (16b) formed in a base 16c of the guide member 16 (see FIG. 5) of the spherical valve body 15a (15b). The valve joints 26a and 26b are constructed such that the outflow pipes 13a and 13b are fit into the opened ends, which are projected from the body case 11 and are airtightly welded at the outer periphery, and the outer periphery of them are airtightly welded to the ends of the valve joints 26a and 26b.

When the opening 14a (14b) is slidably fit to the spherical valve body 15a (15b), good airtightness is maintained, and is detachably brought into close contact with the spherical valve body 15a (15b). The spherical valve body 15a (15b) rolls on the end face of the opening 14a (14b) while being guided by a guide frame 27a (27b) so as not to roll out of the end face of the opening 14a (14b), thereby opening and closing the opening 14a (14b). The automatic alignment springs 19 always urges the spherical valve bodies 15a and 15b toward the alignment position A at which the openings 14a and 14b are closed.

The rotor 20, which is supported by the shaft support parts 11a3 and 11b3 and rotatably and slidably supported by the main shaft 24 disposed at the center of the body case 11, is urged by a compression spring 29, which is placed between the rotor 20 and the inner face of the cover case top plate 11b2 with a bell-shaped washer 28 being interposed therebetween. And the rotor 20 is brought into pressing contact with the upper ends of the spherical valve bodies 15a and 15b by a cam face 30. An outer shell of the rotor 20 is a permanent magnet 31 which is magnetized in a predetermined pattern, and the rotation and a stopping position of the rotor 20 are restrictively controlled by a magnetic field generated by the stator 21 mounted around the outside of the body case 11.

Figure 2A:
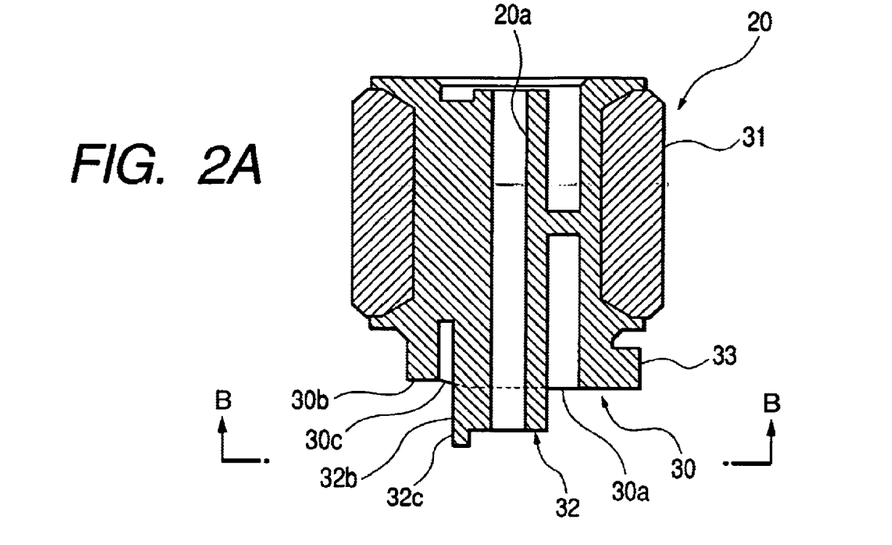
FIGS. 2A and 2B are section views showing a rotor in the valve driving apparatus.
Figure 2B:
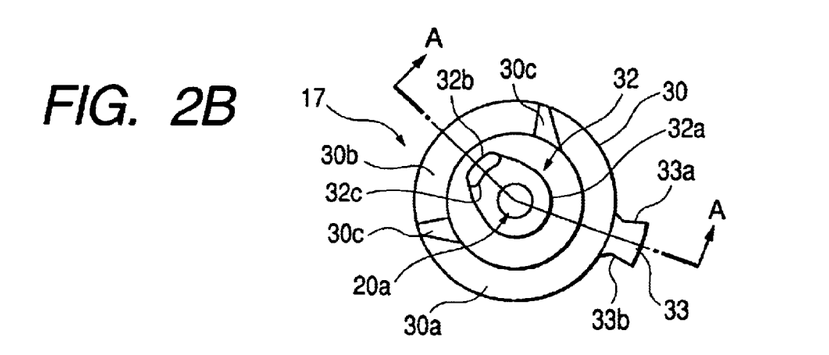

FIG. 2A is a vertical section view showing of the same taken on line A—A in FIG. 2b, and FIG. 2B is a plan view, taken on line B—B in FIG. 2A, showing cam faces 30a, 30b and 30c and an oval cam 32. Reference numeral 33 is an engaging projection which restrictively controls a rotating range of the rotor 20, and is projected from the outer circumferential face of the cam face 30. In particular, a follow face 33a of the engaging projection 33 comes in contact with a rotation stopper 34 of the guide member 16 shown in FIG. 5, and the contact position is used as a mechanical rotation start point S (see FIG. 3A), and the matching of the mechanical system to an electrical control signal is taken.

The cam member 17 for moving the spherical valve bodies 15a and 15b is constructed such that two kinds of cams, a first cam acting in the vertical direction in the figure and a second cam acting in the horizontal direction in the figure, cooperate with the spherical valve bodies 15a and 15b. A layout of those component parts including the engaging projection 33 is illustrated in FIG. 2B in a plan view. Specifically, the first cam is the cam face 30 formed on the end face of the rotor 20 faced to the spherical valve bodies 15a and 15b. The first cam is configured by a crest face 30a and a root face 30b, which are different in height, and a slanted face 30c continuously connecting the crest face 30a and the root face 30b.

The crest face 30a is brought into pressing contact with at one of the spherical valve bodies 15a and 15b or both the spherical valve bodies simultaneously. The spherical valve bodies 15a and 15b support the urging force of the compression spring 29 to tightly close the openings 14a and 14b. The crest face 30a is always brought into pressing contact with one of the spherical valve bodies 15a and 15b to support the load of the rotor 20. Accordingly, the root face 30b is spaced apart from the other of the spherical valve bodies 15a and 15b.

In the figure, the oval cam 32 is protruded downwards from the cam face 30, and located at a mid position between the spherical valve bodies 15a and 15b, and horizontally faces the spherical valve bodies 15a and 15b from inside in substantially the same level or height. The oval cam 32 includes an arcuate face 32a defining its outside contour, a narrowed portion 32b a part of which is projected out of the circumference, and a smooth and continuous face located between them. When the rotor 20 is rotated, the arcuate face 32a is separated from the spherical valve body 15a (15b) and revolves. However, the spherical valve bodies 15a and 15b, located at the alignment position A partly enter a revolving orbit of the narrowed portion 32b, and interferes with the revolution of the narrowed portion 32b as indicated by a two-dot chain line in FIG. 1.

As shown in FIG. 2B, the protruding direction of the narrowed portion 32b is made to correspond to the root face 30b. Either of the spherical valve bodies 15a and 15b, which are confronted with the narrowed portion 32b, is free from the control of the crest face 30a. Accordingly, either of the spherical valve bodies 15a and 15b which correspond to each other on the orbit, is forcibly moved out of the orbit while resisting an elastic force of the automatic alignment spring 19, and the spherical valve bodies 15a and 15b are biased from the alignment position A to outside by a distance "d", so that either of the openings 14a and 14b is opened. In FIG. 1, the spherical valve body 15b is illustrated, and the same thing is true for the spherical valve body 15a located at the symmetrical position.

Figure 3A:
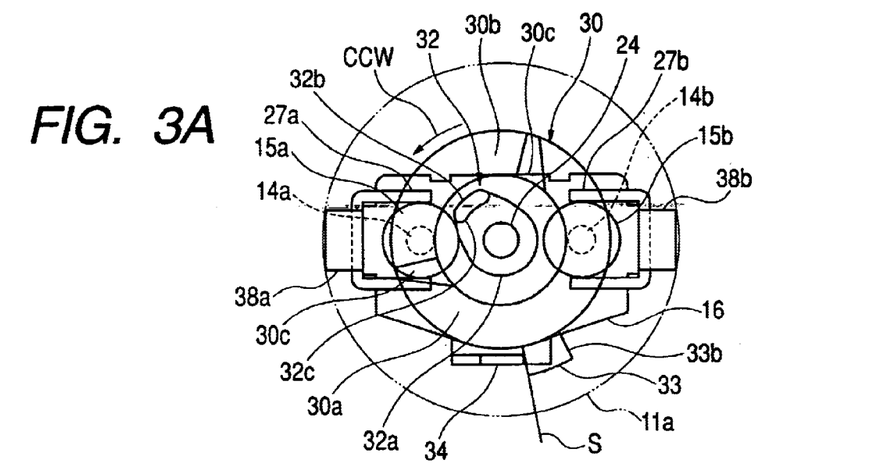
FIGS. 3A to 3E are views diagrammatically showing the opening/closing modes corresponding to rotational angles of the rotor.

FIGS. 3A to 3E are views diagrammatically showing the opening/closing modes of the spherical valve bodies 15a and 15b with respect to rotational angles of the rotor 20. FIG. 3A shows a mechanical rotation start point S of the rotor 20 where the follow face 33a of the engaging projection 33 comes in contact with the rotation stopper 34, and at this position, the matching of the mechanical system to an initial setting of an electrical control circuit is taken. A rotational angle of the rotor is measured starting from this position. At this time, the root face 30b faces the spherical valve body 15a, and the spherical valve body 15a doses the opening 14a in an instable state. The spherical valve body 15b for the opening 14b is brought into pressing contact with the crest face 30a (hatched in the figure) of the cam face 30 to thereby reliably close the opening 14b. Accordingly the openings 14a and 14b are put in a "(opening)-closing" mode. The bracket indicates instability.

Figure 3B:
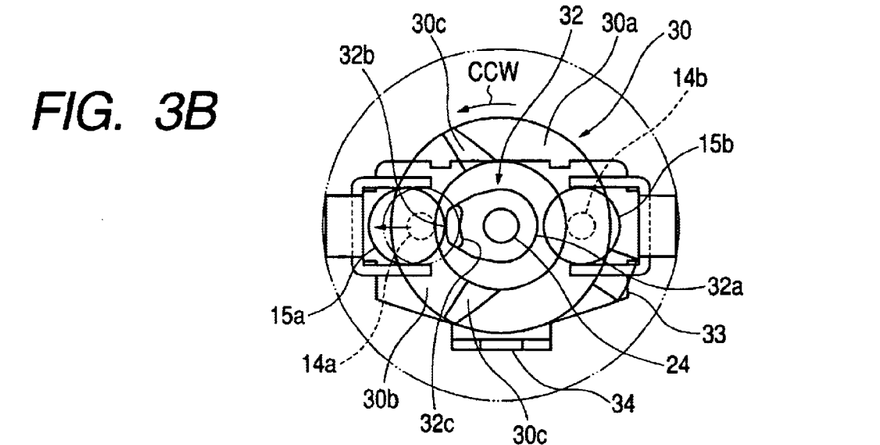

FIG. 3B shows an angular position of the rotor when it is rotated by 45° from the mechanical rotation start point S counterclockwise (arrow CCW) in the figure. At this time, the root face 30b area is continuous above the opening 14a, and the crest face 30a is continuous above the opening 14b. The spherical valve body 15a is pushed out of the alignment position A by the narrowed portion 32b of the oval cam 32 (its position before it is biased is indicated by a two-dot chain line, and the same line will be used for indicating the corresponding positions in the subsequent description). Accordingly, the openings 14a and 14b are put completely in an "opening-closing" mode.

Figure 3C:
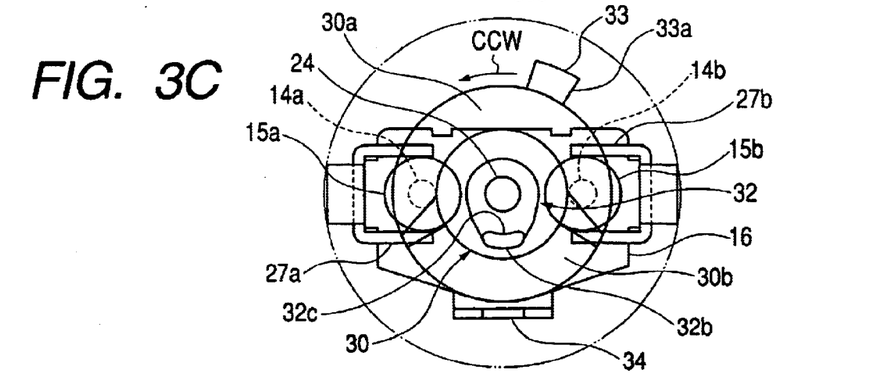

FIG. 3C shows an angular position of the rotor 20 when it is further rotated by 90° from the FIG. 3B position counterclockwise (arrow CCV) in the figure. At this time, the crest face 30a moves to above the openings 14a and 14b, the spherical valve bodies 15a and 15b are both under pressing by the crest face 30a, and the openings 14a and 14b are reliably put in a "closing-closing" mode.

Figure 3D:
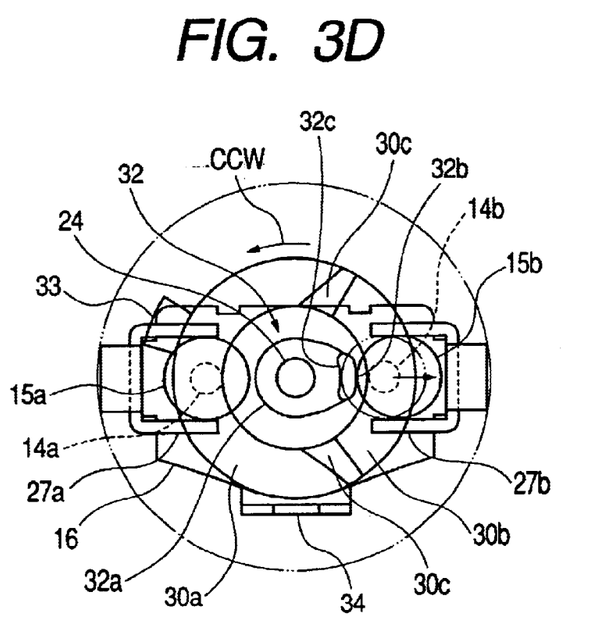

FIG. 3D shows an angular position of the rotor 20 when it is further rotated by 90° from the FIG. 3C position counterclockwise (arrow CCW) in the figure. At this time, the spherical value body 15a for the opening 14a is brought into pressing contact with the crest face 30a of the cam face 30. The spherical valve body 15b for the opening 14b is pushed by the narrowed portion 32b of the oval cam 32, so that the openings 14a and 14b are reliably placed to a "closing-opening" mode.

Figure 3E:
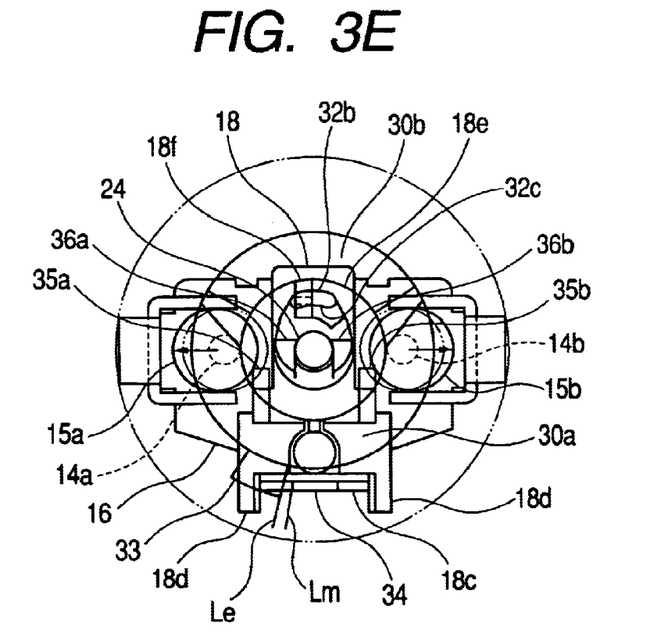

When the rotor is further rotated from the FIG. 3D position counterclockwise (arrow CCW) by 90°, the crest face 30a moves above the openings 14a and 14b, as shown in FIG. 3E. It is an object of the valve driving apparatus of the invention to enable the openings 14a and 14b to be placed to an "opening-opening" mode at this position. To achieve the object, in the invention, the rotor 20 itself slides upward through is rotation to thereby prevent the cam face 30 to engage with the spherical valve bodies 15a and 15b, and the cam actuator 18 is provided as a functional member for biasing simultaneously the spherical valve bodies 15a and 15b from the alignment position A.

Figure 4:
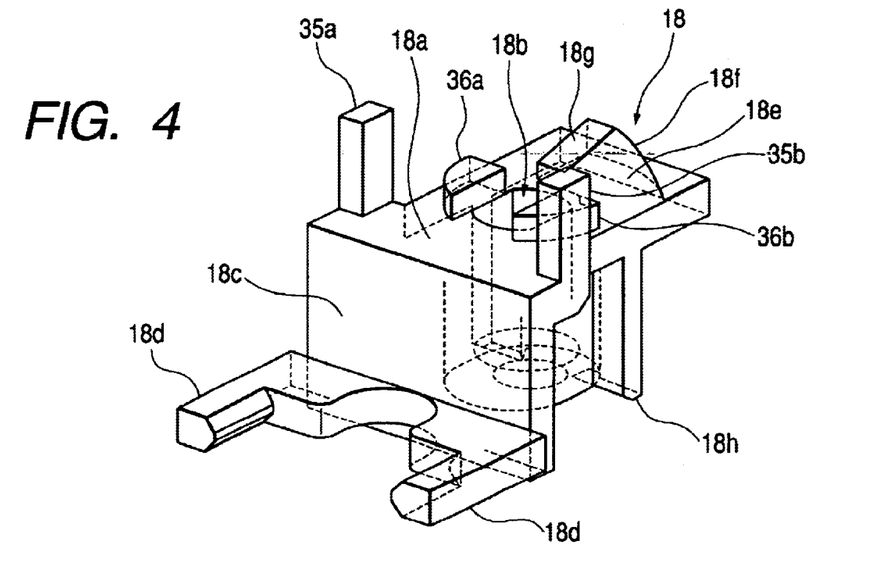
FIG. 4 is a perspective view showing a cam actuator incorporated in the valve driving apparatus.

FIG. 4 is a perspective view showing a cam actuator 18 swung through the rotation of the rotor 20. The cam actuator 18 is movably placed between the oval cam 32 and the base 16c of the guide member 16 illustrated perspectively in FIG. 5 (see FIGS. 6A through 7B). The main shaft 24 is loosely inserted into the through hole 18b located at the central part of the operation face 18a of the cam actuator 18. The main shaft 24 further passes through the through hole 16d located at the central part of the guide member 16 shown in FIG. 5. For the cam actuator 18, the inner edges of a bifurcated arm 18d extending forward from a front wall 18c serves as a guide engaging part, and slidably holds a vertical wall 16e of the guide member 16.

Figure 5:
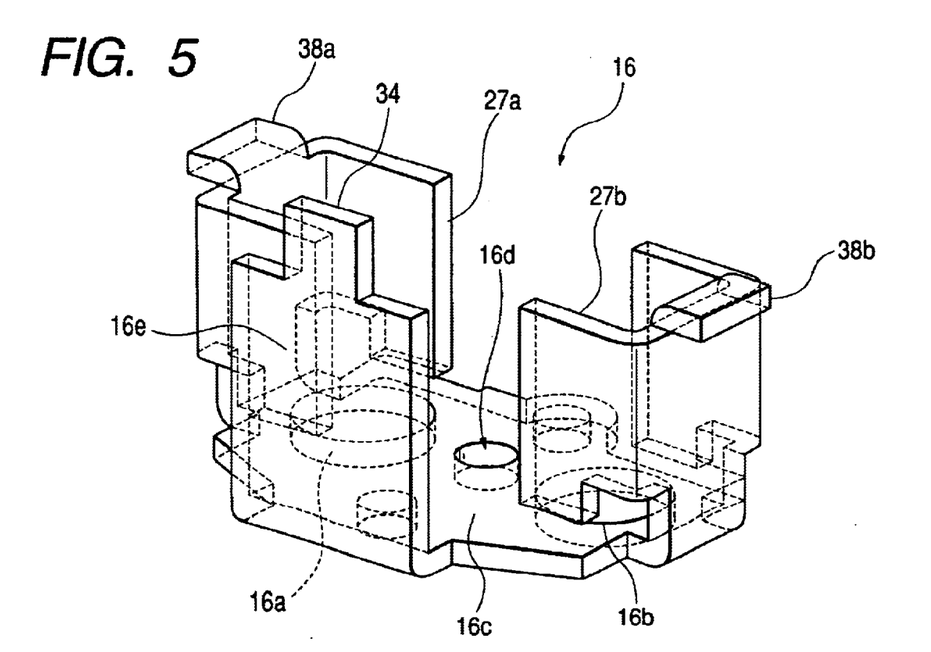
FIG. 5 is a perspective view showing a guide member incorporated in the valve driving apparatus.

As shown in FIG. 5, the through holes 16a and 16b, which are used for positioning the valve joints 26a and 26b to the through hole 16d of the main shaft 24 and fixing in an upstanding fashion, are formed in the base 16c. The guide frames 27a and 27b for the spherical valve bodies stand erect substantially vertically from both sides of the base 16c. The guide frames surround the valve joints 26a and 26b and the spherical valve bodies 15a and 15b in three directions (U-shaped in the plan view), and the opened ends of them are faced with each other.

The spherical valve bodies 16a and 16b are allowed to move for opening and closing within a closed inner space, substantially rectangular, defined by the guide frames 27a and 27b, and are held so as not to be slipped off from the openings 14a and 14b of the valve joints 26a and 26b. Further, the outer edge of the vertical wall 16e of the guide member 16 comes in sliding contact with the inner edges of the front wall 18c extending forward from the cam actuator 18, thereby restrictively controlling the rotation of the cam actuator 18 about the main shaft 24, which is caused by a horizontal acting force as received from the cam member 17. An upper extended part of the vertical wall 16e is reduced in width to form the rotation stopper 34.

Radially positioning parts 38a and 38b, which come in contact with the inner peripheral wall of the main case 11a, extend from the upper edges of the guide frames 27a and 27b for the spherical valve bodies, and the whole guide member 16 is easily and precisely positioned in the radial direction to the main case 11a. At this time, the positioning parts 38a and 38b are arranged such that the main case 11a is placed in substantially the same level or height as the flange 11a1 of the main case 11a coupled to the cover case 11b.

Figure 2C:
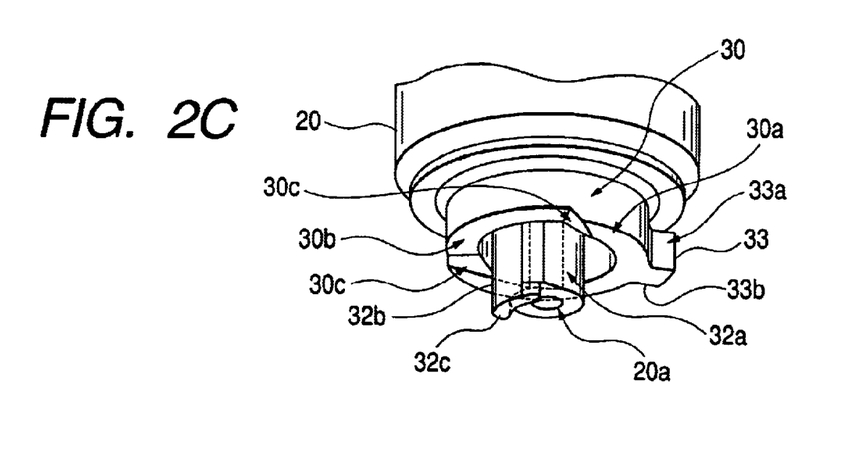
FIG. 2C is a perspective view showing a part of the cam member.

The cam actuator 18 is swung with the rotation of the rotor 20 through the action of the engaging projection 32c (see FIG. 2) projected downward in the figure from the narrowed portion 32b of the oval cam 32. Specifically, the cam actuator 18 is constructed such that a raised part 18f including a swing slanted face 18e at one side is formed on an operation face 18a. Thus, a balancing mechanism like a seesaw of which the fulcrum is a leg part 18h extending to a position right under a force application point of a top part 18g is formed.

The pressing members 35a and 35b for the spherical valve bodies 15a and 15b stands erect on the operation face 18a. The sliding projections 36a and 36b are projected upward at positions closer to the pressing members 35a and 35b and close to the center positions of the side edges of the operation face 18a. The sliding projections 36a and 36b act on the end face of the oval cam 32, as force acting points of the seesaw operation, and move upward together with the cam face 30, through the sliding motion along the main shaft 24, thereby separating from the spherical valve bodies 15a and 15b (see FIG. 7B).

Figure 6A:
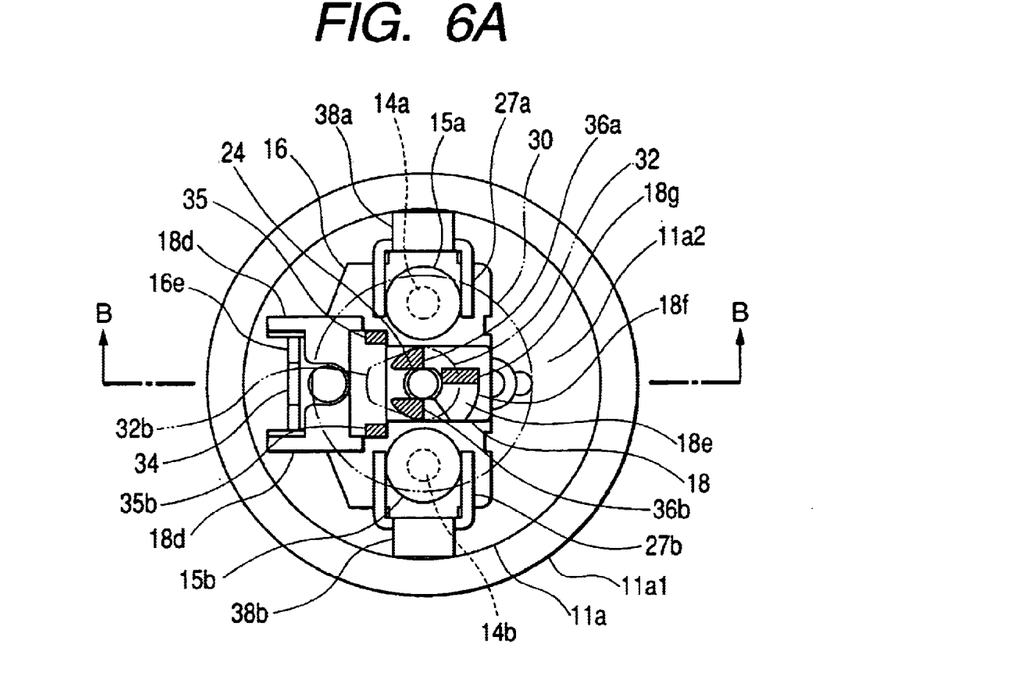
FIG. 6A is a plan view showing a part of the cam actuator when the apparatus is in a closing-opening mode.
Figure 6B:
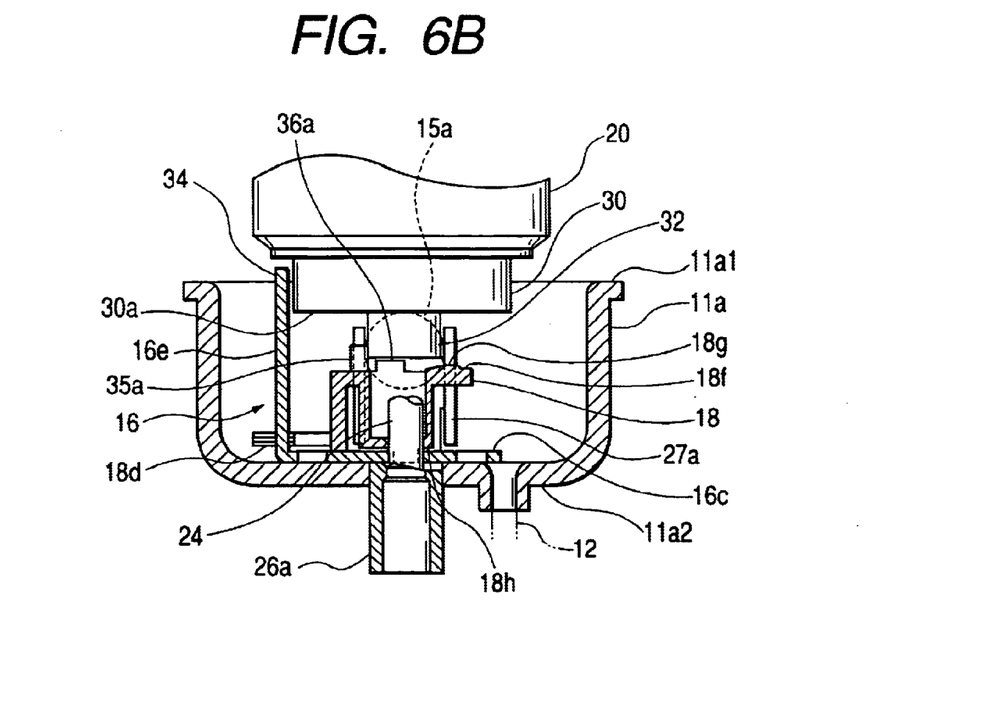
FIG. 6B is a partial section view taken along the line B—B in FIG. 6A.
Figure 7A:
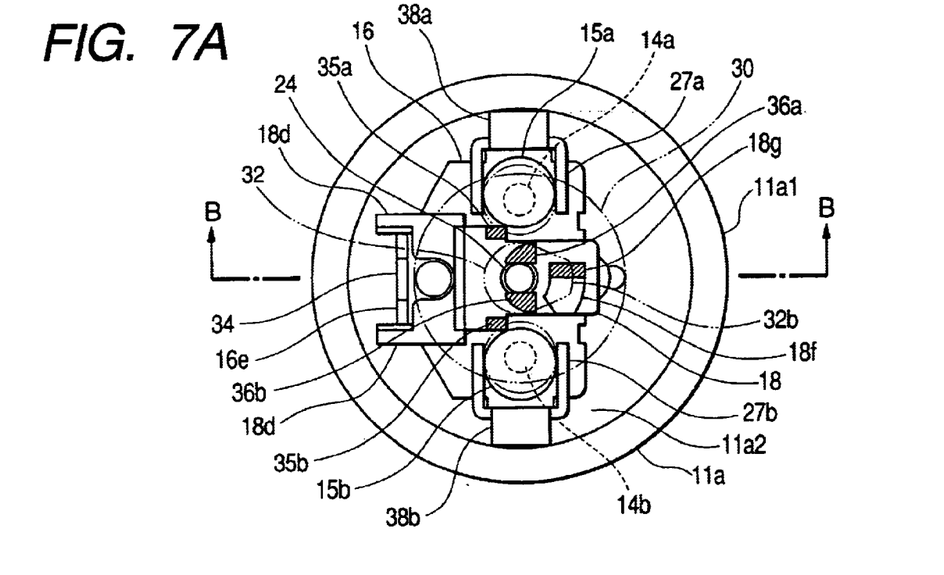
FIG. 7A is a plan view showing a part of the cam actuator when the apparatus is in an opening-opening mode.
Figure 7B:
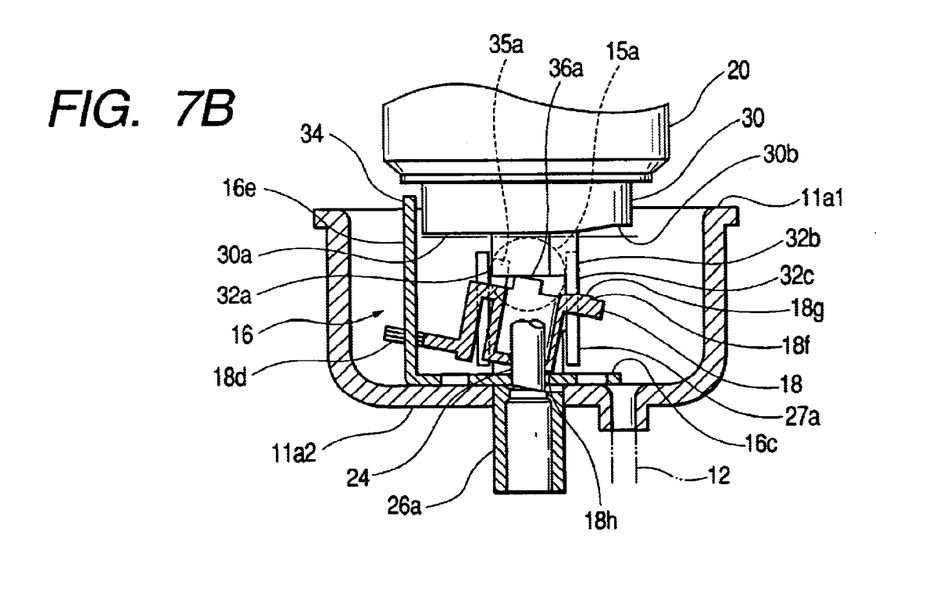
FIG. 7B is a partial section view taken along the line B—B in FIG. 7A.

Operation of the cam actuator 18 will be described with reference to FIGS. 6A through 7B. FIGS. 6A and 6B correspond to FIG. 3C. FIGS. 7A and 7B correspond to FIG. 3E. The engaging projection 32c of the lower face of the oval cam 32 comes in sliding contact with the slanted face 18d of the cam actuator 18, and moves the cam actuator 18 up or down about the leg end part 18g as the fulcrum. The projections 36a and 36b impart a counter force to the counterbalance on the end face of the oval cam 32, and move upward the cam face 30 of the rotor 20, thereby forming gaps between the crest face 30a and the spherical valve bodies 15a and 15b. The pressing members 36a and 36b concurrently bias both the spherical valve bodies 15a and 15b out of the alignment position A of them with the openings 14a and 14b, whereby the openings 14a and 14b are placed to the "opening-opening" mode.

Here, the rotor 20 completes the option of setting up all the modes, and a rotation limit of the motor 22 is electrically set up. Specifically, the rotor 20 reciprocatively rotates within an angular range of about 300°, from the mechanical rotation start point S to an electrical rotation limit Lc. Such a mechanical limit Lm that the rotation stopper 34 of the guide member 16 comes in contact with a lead face 33b of the positioning projection 33 of the rotor 20, and its movement is mechanically blocked, is used. With this, the rotor rotation is adjusted to be in harmony with the electrical rotation range.

When the rotor 20 is reversely turned from a maximum rotation position Le of FIG. 7, upon receipt of the urging force of the compression spring 29 located in the upper part of the rotor 20, the engaging projection 32c of the lower side of the oval cam 32 descends, together with the rotor 20 from the raised part 18f of the cam actuator 18 along the slanted face 18d. When the crest face 30a of the cam face 30 on the lower face of the rotor 20 is supported by the spherical valve body 15b, the engaging projection 32c completely separates from the cam actuator 18.

The valve driving apparatus 10 is installed taking a posture shown in FIG. 1, viz., the cam face 30 is directed downward and the motor 22 is located in the upper part. Accordingly, in the cam actuator 18, which has released from the pressing by the engaging projection 32c, the operation face 18a automatically resumes the horizontal posture through the gravity action since the center of gravity is located at a position closer to the bifurcated arm 18d than the top part 18g as the fulcrum. And the lower end of the front wall 18c is stably supported on the upper face of the base 16c of the guide member 16 as shown in FIGS. 6A and 6B.

Figure 8A:
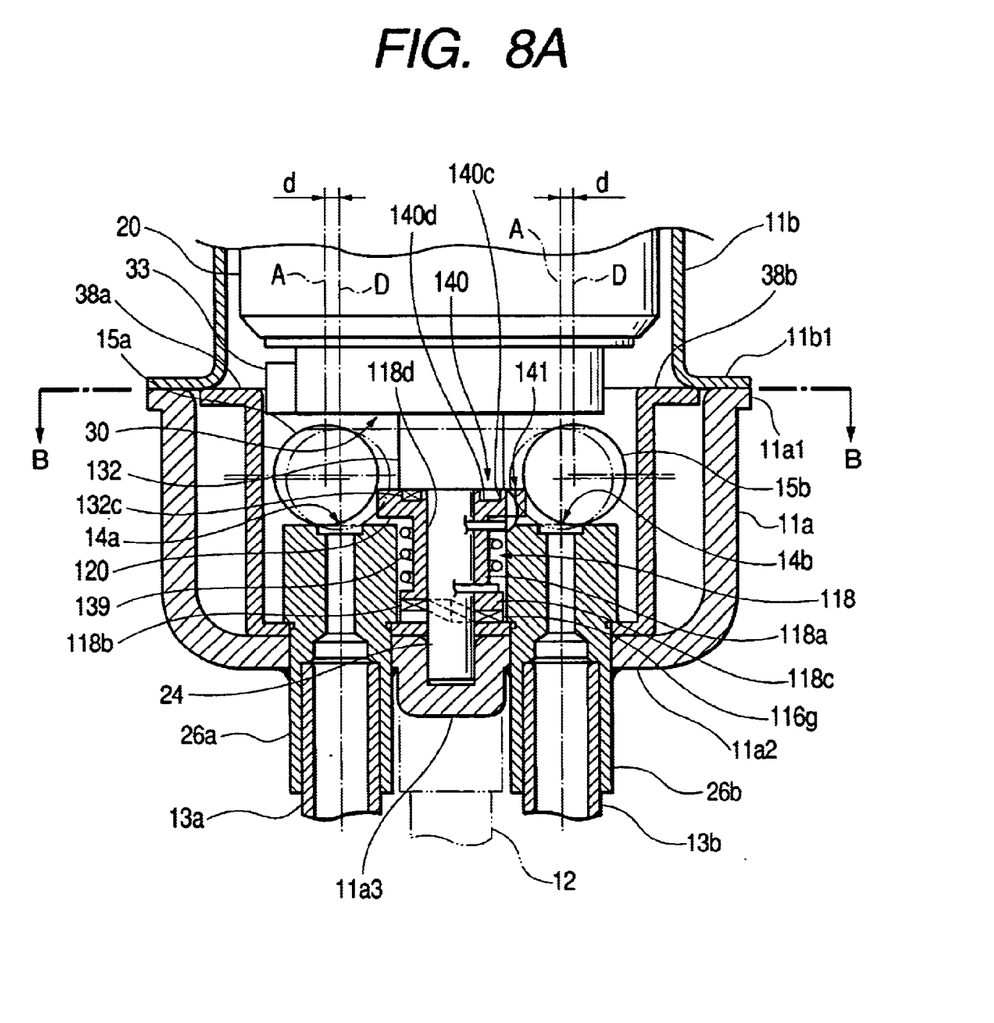
FIG. 8A is a vertical section view showing a cam actuator incorporated in a valve driving apparatus according to a second embodiment of the invention.
Figure 8B:
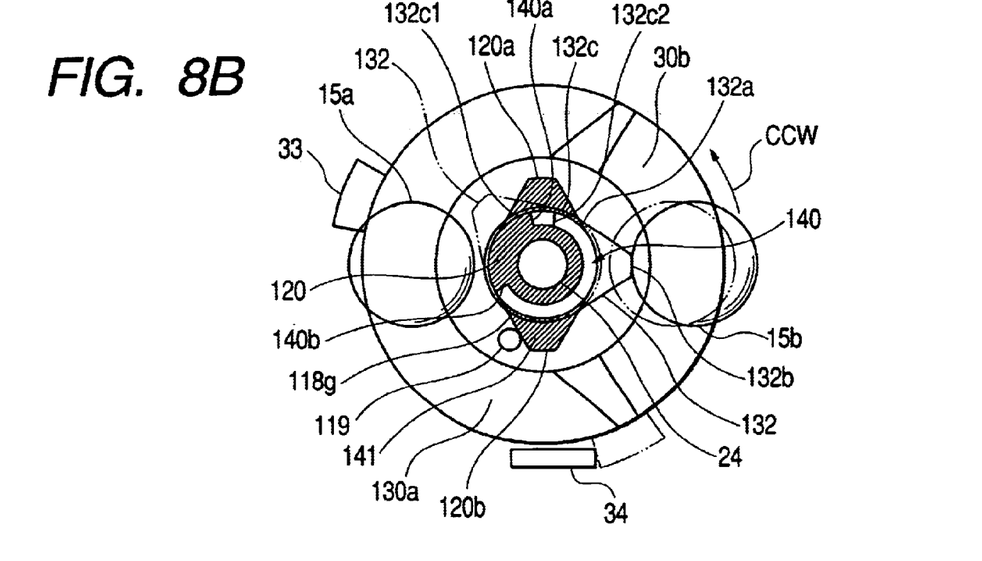
FIGS. 8B and 8C are horizontal section views taken along the line B—B in FIG. 8A, for explaining the operation of the cam actuator.
Figure 8C:
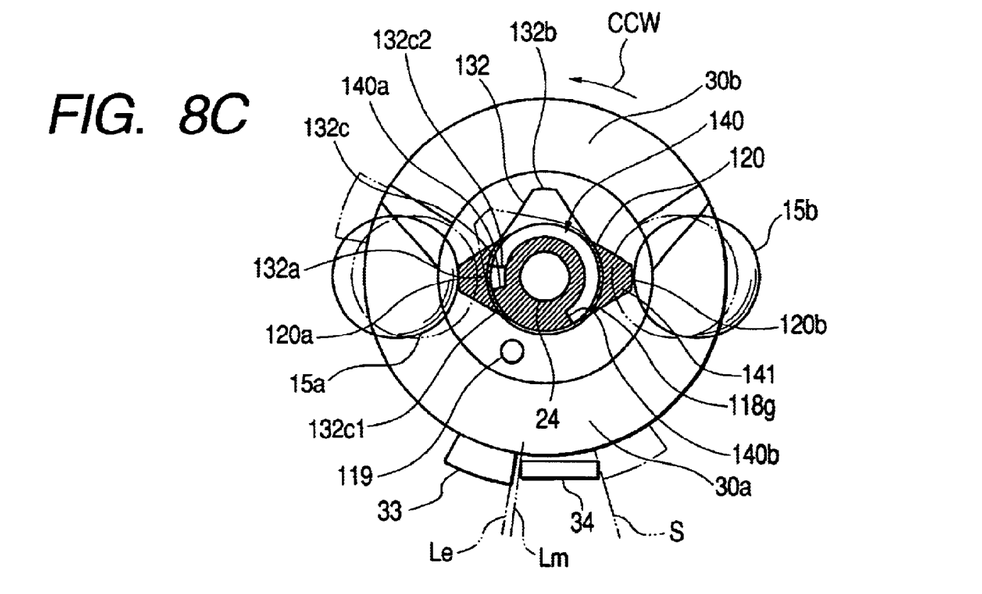

FIGS. 8A to 8C are views showing a part of a cam actuator 118 according to a second embodiment of the invention. In the figure, like or equivalent portions are designated by like reference numerals, for simplicity of explanation.

Configurations, dimensions and mechanical layouts of the cam face 30 on the lower face of the rotor 20, an oval cam 132, and the engaging projection 33 on the outer peripheral face of the rotor 20 in the present embodiment remain unchanged when comparing with the first embodiment. An engaging projection 132c in the lower part of the oval cam 132 projects from a lower part of an outer peripheral face 12a, which is displaced 90° in the advancing direction, from a narrowed portion 132b. As for the construction of the cam actuator 118, an elliptical pressing cam 120 having twin narrowed portions 120a and 120b protruding outward in the diameter direction on both sides, is formed on one of the end faces of a cylindrical body part 118a. The other end face 118b has a flange 118c expanded outward. On this face, at least four teeth arrayed like a saw are provided at an angular interval of 90°. For simplicity of explanation, the narrowed portion 120a of the pressing cam 120 is referred to as a preceding narrowed portion, and the narrowed portion 120b, as a succeeding narrowed portion. A contour of each of the narrowed portions 120a and 120b resembles that of the oval cam 132. The cylindrical body part 118a has a center hole 118d passing therethrough, and when the main shaft 24 is inserted into the center hole 118d, the cylindrical body part is smoothly rotated and slidable.

A C-shaped groove 140 is formed in the upper face of the cam actuator 118. End faces of the C-shaped groove 140 are both set in the following way. As shown in FIG. 8B, when viewed from top of the drawing sheet, when the narrowed portion 132b of the oval cam 132, disposed coaxially with the groove, is rotated 90° counterclockwise from the narrowed portion 120a of the pressing cam 120, and placed over it, the engaging projection 132c on the lower side is put within the C-shaped groove 140. The groove end face 140a of the groove aligned with a led face 132c1 of the engaging projection 132c is used as a preceding end face. The oval cam 132 is turned counterclockwise from this position while keeping its coaxiality, and the groove end the 140b aligned with a follow face 132c2 of the engaging projection 132c is used as a succeeding end face. The C-shaped groove 140 is provided such that the engaging projection 132c may be rotated within a range from the preceding end face 140a to the succeeding end face 140b, without any interference by a groove face 140c and a groove bottom face 140d.

The cam actuator 118 is disposed such that an axial line connecting the centers of the top parts 120a and 120b of the cam actuator is perpendicular to an axial line connecting the centers of the openings 14a and 14b. A turn-preventing pin 119, which comes in contact with a succeeding face 118g of the succeeding narrowed portion 120b of the pressing cam 120, is planted in the base 16c of the guide member 16. A twisted compression spring 139 is wound around the outer peripheral face of a cylindrical body 118a of the cam actuator 118, and one end of the spring is inserted into a through hole 141 formed in the pressing cam 120, and fixed thereat, while the other end of the spring is fixed to the turn-preventing pin 119. The twisted compression spring 139 urges such that the succeeding face 118g of the succeeding narrowed portion 120b of the pressing cam 120 is pressed against the turn-preventing pin 119. Specifically, the cam actuator 118 waits in a state that the pressing cam 120 is set at the engaging part of it with the turn-preventing pin 119, till the engaging projection 132c on the lower face of the oval cam 132 is turned in the C-shaped groove 140, and comes into engagement with the groove end face 140a.

Sliding slanted faces 116g are formed, by cutting, in the base 16c of the guide member 16, while being arranged at pitches, which are arrayed complementarily to the angular pitches of the teeth 118b of the cam actuator 118. Accordingly, in a state that the succeeding face 118g of the succeeding narrowed portion 120b of the pressing cam 120 is in contact with the turn-preventing pin 119 by the urging force of the twisted compression spring 139, the to 118b most deeply bite the sliding slanted faces 116g of the base 16c, and those are entirely superimposed one on the other, and the cam actuator 118 waits at the lowest position.

The rotor 20 rotates from the mechanical rotation start point S, and the cam actuator 118, together with the rotor 20, rotates from a position (FIG. 8B) where the projection 132c of the oval cam 132 is brought into contact with the groove end face 140a of the C-shaped groove 140 of the cam actuator 118, and the teeth 118b slide up along the sliding slanted faces 116g. The upper face of the cam actuator 118 comes in contact with the bottom face of the oval cam 132 and reaches the highest position where the tops of the slanted faces come in contact with one another while pushing upward the rotor 20.

At this time, the crest face 30a of the cam face 30 is sufficiently spaced apart from the spherical valve bodies 15a and 15b (FIG. 8A). And, the pressing cam 120, together with the preceding narrowed portion 120a and the succeeding narrowed portion 120b, moves the spherical valve bodies 15a and 15b from the alignment position A where the openings 14a and 14b are closed to the outside, bias position D, and simultaneously opens the openings 14a and 14b. Accordingly, the "opening-opening" mode is reliably set up while the crest face 30a of the cam face 30 does not interfere with the spherical valve bodies 15a and 15b (see FIGS. 8A and 8C).

While the embodiments of the valve driving apparatus constructed according to the present invention have been described, it will readily be understood by those skilled in the art that the invention is not limited to these specific embodiments, but may variously be modified, altered and changed within the true spirits and scope of the invention. For the swinging of the cam actuator, it is satisfactory to construct the cam actuator such that the swing motion is allowed while inhibiting the lateral motion, the forward and backward motions, and the rotation.

What is claimed is:

1. A valve driving apparatus, comprising:
   a first pipe, a second pipe and a third pipe, which are airtightly connected with each other;
   a valve body;
   cam member, which rotates about a rotation axis for moving the valve body so as to open/close the first pipe and the second pipe so that the third pipe is selectively communicated with the first pipe and the second pipe, the cam member being movable in a direction parallel with the rotation axis; and
   a cam actuator, which drives the cam member so as to move the cam member in the direction parallel with the rotation axis to open both of the first pipe and the second pipe, when the cam member is rotated at a predetermined angle.

2. A valve driving apparatus, comprising:
   an inflow pipe;
   an outflow pipe;
   a casing body having an airtight chamber formed with openings respectively communicated with the inflow pipe and the outflow pipe;
   a valve body;
   a cam member, which provides an urging force on the valve body in such a direction that the valve body closes at least one of the openings;
   a cam driver, which provides a driving force for rotating the cam member; and
   a cam actuator, which moves the cam member against the urging force such that the openings are simultaneously opened.

3. The valve driving apparatus as set forth in claim 2, wherein the cam actuator includes:
   a seesaw portion, which performs a seesaw action in which the urging force moves the cam actuator and the seesaw portion moves the cam member against the urging force as a reaction; and an actuating portion, which moves the valve body to simultaneously open the openings when the seesaw action is performed.

4. The valve driving apparatus as set forth in claim 3, wherein the cam member provides the urging force by utilizing the driving force of the cam driver.

5. The valve driving apparatus as set forth in claim 3, wherein a direction in which the cam member is moved as the reaction of the seesaw action is a direction parallel with a direction in which the urging force acts.

6. The valve driving apparatus as set forth in claim 3, wherein;

the seesaw portion extends in a direction perpendicular to a rotation axis of the cam member;

a first position at which the urging force is applied is situated in a first end portion of the seesaw portion;

the first position serves as a fulcrum of the seesaw action;

a second position at which the actuating portion is provided is situated in a second end portion of the see saw portion; and a slider which moves the cam member is situated at a third position closer to the second position.

7. The valve driving apparatus as set forth in claim 6, further comprising a guide member which restricts a direction in which the seesaw action is performed.

8. The valve driving apparatus as set forth in claim 7, wherein:

the valve body is spherical body which is urged by an urging member so as to close the openings; and the guide member restricts a position of the valve body.

9. The valve driving apparatus as set forth in claim 2, further comprising:

a rotor, integrated with the cam member; and a stator, provided an outer periphery of the casing body, wherein a motor formed by the rotor and the stator constitutes the cam driver.

* * * * *